Dec. 17, 1963 S B. TAYLOR 3,114,168
HYDRAULIC WINDSHIELD WIPER AND WASHER
Filed Feb. 27, 1962
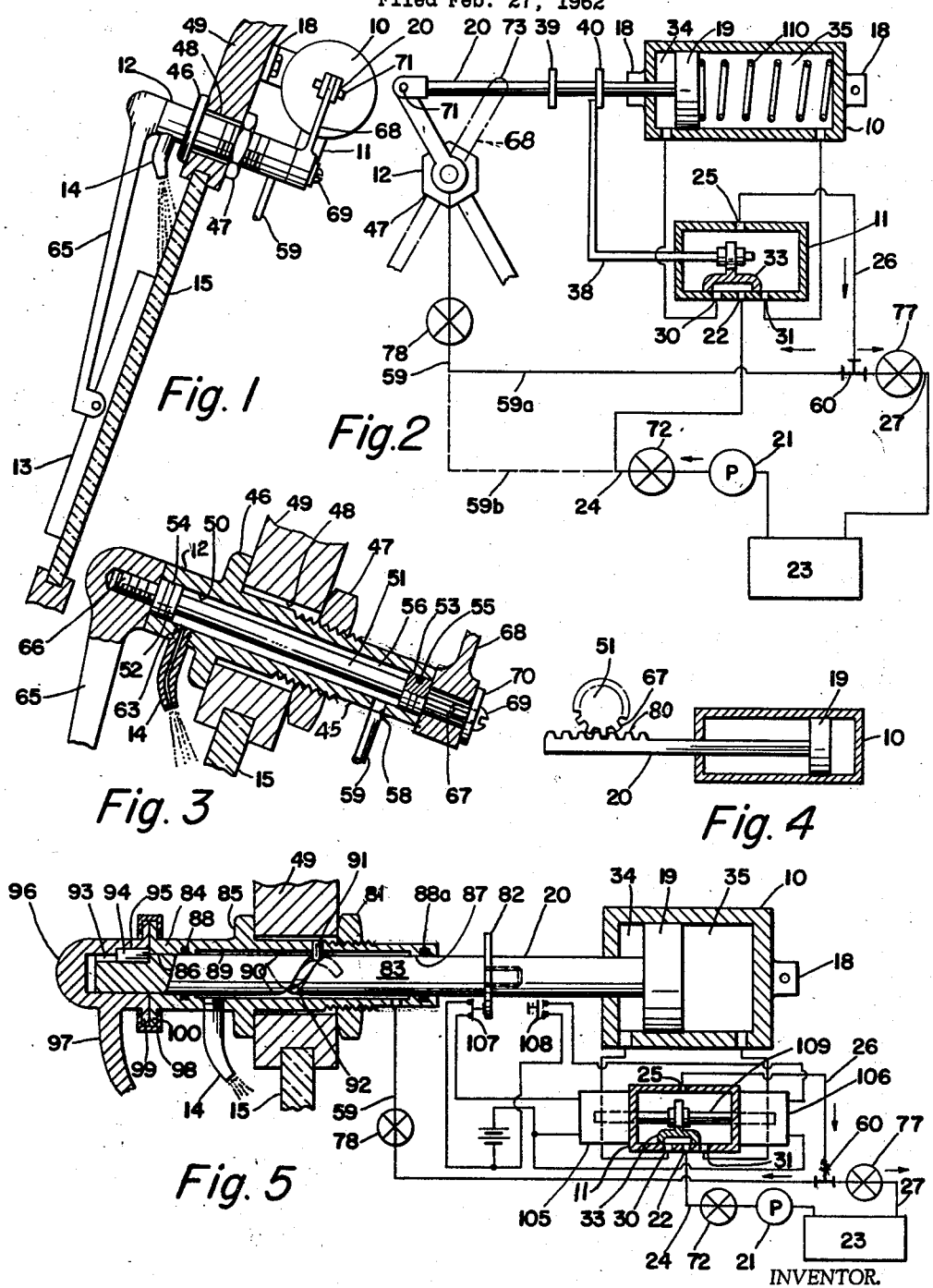
INVENTOR.
S BLACKWELL TAYLOR
BY
John N. Wolfram
ATTORNEY

United States Patent Office 3,114,168
Patented Dec. 17, 1963

3,114,168
HYDRAULIC WINDSHIELD WIPER AND WASHER
S Blackwell Taylor, 21850 S. Woodland Road,
Shaker Heights, Ohio
Filed Feb. 27, 1962, Ser. No. 175,986
10 Claims. (Cl. 15—250.02)

This invention relates to windshield wipers and more particularly to a hydraulically operated windshield wiper in which part of the hydraulic fluid is sprayed upon the windshield for cleaning the same.

The invention is particularly adaptable for use on boats. Such applicataions require better windshield cleaning devices and methods than land vehicles due to the frequent splashing and spraying of water upon the windshield by the action of wind and waves. The problem of maintaining a clear windshield on boats is especially difficult on the ocean since the salt in the water precipitates out and leaves a film on the windshield. Present attempts to overcome this problem involve the use of a fresh water spray operating in conjunction with electrically driven wiper blades. However, such electrically operated devices have a very short life and poor reliability because of exposure to salt atmosphere.

My invention overcomes these difficulties by providing a hydraulically operated wiper blade in which fresh water is used as the motive fluid and with a part of the fresh water being diverted from the hydraulic system and sprayed upon the windshield to dissolve and wash away any salt deposited thereon.

Thus one object of my invention is to provide a hydraulically operated windshield wiping device in which a part of the hydraulic motive fluid is used for washing the windshield.

Another object is to provide a hydraulically operated windshield wiper in which fresh water is used as the hydraulic fluid and a part of the fresh water from the discharge side of the fluid motor is used for washing the windshield.

Another object is to provide a device of the type described in which the amount of fresh water diverted from the hydraulic system for washing the windshield may be adjusted as desired.

It is another object to provide a windshield wiper device of the type described in which the fluid diverted from the hydraulic system for washing the windshield also serves as a lubricant for moving parts of the device.

It is another object to provide a hydraulically operated combination windshield wiper and washer in which the mechanism for transmitting motion from the fluid motor to the wiper blade also provides a passage for fluid diverted from the hydraulic system to a nozzle for spraying the windshield.

Other objects of the invention will be apparent from the following description and from the drawing in which:

FIG. 1 is a cross section view through a windshield and showing the combination windshield wiping and washing device in side view, FIG. 2 is a rear view of the device, partly diagrammatic and partly in cross section, FIG. 3 is a cross section of that part of the device which transmits motion from the hydraulic motor to the windshield wiper blade and which carries the nozzle for spraying fresh water on the windshield, FIG. 4 illustrates an optional drive connection between the hydraulic motor and the windshield wiping unit, and FIG. 5 is a cross section and partly diagrammatic view of a modified form of the invention.

The form of the invention illustrated in FIGS. 1, 2, and 3 includes a hydraulic motor 10 having a reversing valve 11 associated therewith, and a transmitter unit 12 to which a windshield wiper blade 13 is attached and which also carries a nozzle 14 for spraying water upon windshield 15.

The fluid motor or cylinder 10 is mounted to the ship's structure by any suitable means, such as by brackets 18, and has a piston 19 with a piston rod 20 attached thereto.

Reversing valve 11 has an inlet port 22 connected to a water supply tank 23 by means of a supply line 24 and pump 21, and has a discharge or exhaust port 25 also connected to tank 23 by means of pipe lines 26 and 27. Valve 11 also has a pair of cylinder ports 30, 31 connected to opposite ends of cylinder 10.

Mounted within the housing for valve 11 is a valve element 33 which in one position connects inlet port 22 with cylinder port 30 for directing pressure fluid from tank 23 to one end 34 of cylinder 10 and at the same time permits passage of fluid from the opposite end 35 of the cylinder through port 31 to exhaust port 25. In another position of valve element 33 inlet port 22 is connected to cylinder port 31 for directing pressure fluid to cylinder end 35 and port 30 is open to exhaust port 25 to permit discharge of fluid from end 34 of the cylinder.

Attached to valve element 33 is an actuator rod 38 which is alternately engaged by spaced collars 39, 40 rigidly mounted on piston rod 20.

Transmiter unit 12 includes a tubular housing 45 having a flange 46 near one end and having a nut 47 threaded thereon near the other end for clamping the housing within an opening 48 in a wall 49 of the ship's structure.

Transmitter housing 45 has a bore 50 therethrough in which is mounted a shaft 51 having enlarged heads 52, 53 at its ends which are sealed with respect to bore 50 by packings 54, 55. The portion of shaft 51 between heads 52 and 53 is of appreciably smaller diameter than bore 50 to provide an annular passage 56 for fluid. A port 58 and tube 59 connect the inner end of annular passage 56 with return lines 26, 27 by means of a T fitting 60. At the other end of annular passage 56 is a port 63 in which nozzle 14 is mounted.

The end of shaft 51 adjacent head 52 has a threaded driving connection 66 with wiper arm 65 and the other end of shaft 51 has a splined extension 67 engaged in a splined bore through crank arm 68, the parts being suitably retained by a screw 69 and washer 70 The other end of crank arm 68 is attached to piston rod 20 by a suitable pin 71.

Operation of the windshield wiper may be initiated by starting pump 21 or by opening of valve 72 while pump 21 is running. This causes fresh water from tank 23 to be delivered under pressure through line 24 to inlet port 22 of valve 11. With the parts in the position shown in FIG. 2, the pressure fluid is delivered from inlet port 22 through port 30 to end 34 of the cylinder and causes piston 19 to move toward cylinder end 35. At the same time, water in cylinder end 35 is forced through ports 31 and 25 to return line 26. Part of the returning water passes to tank 23 through line 27 while another part passes through line 59 to transmitter unit 12 and annular passage 56 therein to nozzle 14 from which it sprays upon windshield 15.

As piston 19 moves toward cylinder end 35 it rotates crank arm 68 to the dotted position shown at 73 and thus causes angular movement in one direction of shaft 51 and wiper arm 65.

When piston 19 nearly reaches the end of its stroke toward cylinder end 35 collar 39 engages rod 38 to move valve element 33 to the right, as viewed in FIG. 2. Such rightward movement of valve element 33 causes inlet port 22 to be disconnected from port 30 and connected to port 31 so that high pressure fluid will now be delivered to cylinder end 35 and cause piston 19 to reverse its direction and move toward cylinder end 34. At the same time, return port 25 is disconnected from port 31 and connected to port 30 so that water from cylinder end 34 can be returned to line 26 from which a part is returned to tank 23 through line 27 and part is delivered to the windshield through line 59 and transmitter 12. As piston 19 moves toward cylinder end 34 crank arm 68 reverses the direction of its movement to move from the dotted position of 73 to the full line position shown in FIG. 2. This causes corresponding reversal of the angular movement of shaft 51 and wiper arm 65.

As piston 19 nears the end of its stroke toward cylinder end 34 collar 40 contacts rod 38 to move valve element 33 to the position shown in FIG. 2 to again cause piston 19 to move toward cylinder end 35, as previously described.

A valve 77 may be inserted in return line 27 for controlling the speed of movement of piston 19 and hence wiper arm 65 by restricting the return flow of fluid through line 27 to tank 23. Restriction of return flow in this manner slows down the speed with which windshield wiper arm 65 reciprocates and also tends to increase the flow of water through nozzle 14. If desired, an additional valve 78 may be placed in line 59 for further controlling the amount of water delivered to nozzle 14.

In an alternate hook-up line 59 may be connected to pressure supply line 24, as indicated by the dotted line in FIG. 2, rather than to return lines 26, 27. In such case, the portion of the line designated 59a is omitted.

FIG. 4 illustrates a modified arrangement for making a driving connection between shaft 51 and piston rod 20. In this instance, piston rod 20 is provided with a gear rack 80 in engagement with the splines or teeth 67 on shaft 51.

In the modification of FIG. 5, collars 39 and 40 are omitted from piston rod 20 and a single collar 82 is substituted, collar 82 being held in a fixed position between inner and outer parts of piston rod 20 which are threaded together.

The outer part 83 of the piston rod is received within a transmitter housing 84 of modified form. Housing 84 has flange 85 and a nut 81 for clamping the same to wall 49. It also has bore portions 86 and 87 at opposite ends thereof which have a slight clearance with outer portion 83 of the piston rod and which are sealed with respect thereto by packings 88, 88a. Intermediate bore portions 86 and 87 is an enlarged bore portion 89 which forms an annular clearance 90 around rod end 83. A pin 91 is rigidly attached to housing 84 and projects inwardly to engage a helical groove 92 formed in outer end 83 of the piston rod.

At its outer end rod portion 83 has an axial keyway 93 for slidably receiving a key 94 which is axially and radially fixed within an axial slot 95 in the hub 96 of wiper arm 97. Hub 96 is rotatably attached to housing 84 by means of a channelled ring 98 which overlaps flanges 99 and 100 formed on hub 96 and housing 84 respectively.

FIG. 5 also shows an optional means for causing automatic reciprocation of piston 19. In this instance valve element 33, which is attached to armature 109, is moved in one direction by a solenoid 105 and in the opposite direction by a solenoid 106. Solenoid 105 is controlled by a switch 107 and solenoid 106 is controlled by a switch 108.

During operation, when pump 21 is turned on with the parts in the position as shown in FIG. 5, switch 107 is closed to momentarily energize solenoid 105 to retain valve element 33 in the position shown. At this time pressure fluid flows from inlet port 22 through cylinder port 30 to the left end 34 of cylinder 10 to move piston 19 toward the right. As piston 19 moves toward the right, switch 107 is opened to de-energize solenoid 105 but valve element 33 remains in the position shown. When piston 19 nears the end of its stroke toward the right, collar 82 closes switch 108 to energize solenoid 106. This moves valve element 33 to the right for reversing the supplying and exhausting of fluid to the ends of cylinder 10, as previously described, and piston 19 starts moving to the left.

As piston 19 reciprocates axially, it is also caused to reciprocate angularly by reason of the engagement of pin 91 within helical groove 92 in piston rod end 83. This also causes hub 96 and wiper arm 97 to reciprocate angularly because of the connection with piston rod portion 83 through key 94. Helical slot 92 is of such length that it at no time overlaps either of the seals 88, 88a. Likewise keyway 93 does not pass under packing 88 when piston rod 20 moves to the right. As piston rod 20 reciprocates, part of the water from return line 26 is diverted into tube 59, as previously explained in connection with FIG. 2, and passes through clearance 90 and nozzle 14 to be sprayed upon windshield 15.

In the embodiments shown, valve 11 is a four way valve which alternately directs and exhausts fluid from each end of cylinder 10. If desired, valve 11 may be a three way valve, as by omitting port 31, for directing and exhausting fluid to and from only one end 34 of the cylinder with a spring 110 being utilized to actuate the return stroke of the piston. In such case line 59 must be connected to pressure line 24 as shown by dotted line 59b in FIG. 2, rather than to exhaust line 26, to have continuous spraying of the windshield. Otherwise spraying would occur only while the piston is being actuated in the one direction by spring 110.

It will be noted that in the FIG. 3 form of the invention the water passing through clearance 56 helps to lubricate the angular sliding contact between heads 52, 53 and bore 50 while in the FIG. 5 form the water passing through clearance 90 lubricates both the axial and angular movement of piston rod portion 83 within housing 84, as well as the contact between pin 91 and helical slot 92.

Although several forms of the invention have been illustrated and described, it is obvious that other modifications may be made which come within the scope of the invention as defined by the claims.

I claim:

1. A windshield cleaning apparatus comprising in combination: a windshield wiper arm, a housing for supporting the arm, a hydraulically operated motor connected to the wiper arm for oscillating the same, a reservoir for hydraulic fluid, supply and exhaust conduits leading from the reservoir, a reversing valve for controlling flow of fluid from said supply conduit to said motor and from said motor to said exhaust conduit, a branch conduit leading from the exhaust conduit to said housing, means for directing fluid from said housing to the windshield, and a valve in said branch conduit for controlling the amount of fluid delivered to the windshield.

2. The apparatus of claim 1 in which there is an additional valve in said exhaust conduit downstream of said branch conduit for further assisting in the control of the amount of fluid delivered to the windshield.

3. A windshield apparatus comprising a windshield wiper arm, a hydraulically operated motor connected to the wiper arm for oscillating the same, a reversing valve for controlling flow of fluid from a source of fluid supply to the motor for operating the same, a supply line leading from the source of fluid supply to said reversing valve, a branch conduit leading from the supply line for directing at least a portion of said fluid to the windshield, and a valve in said supply line for controlling the amount of fluid delivered to said reversing valve.

4. The apparatus of claim 3 in which there is another valve in said branch conduit for controlling the amount of fluid delivered to the windshield.

5. A windshield apparatus comprising a windshield wiper arm, a hydraulically operated motor connected to the wiper arm for oscillating the same, a reversing valve for controlling flow of fluid from a source of fluid supply to the motor for operating the same, a supply line leading from the source of fluid supply to said reversing valve, a branch conduit leading from the supply line for directing at least a portion of said fluid to the windshield, and a valve in said branch conduit for controlling the amount of fluid delivered to the windshield.

6. A windshield cleaning apparatus comprising a hollow transmitter housing, a windshield wiper arm including a shaft journaled for angular reciprocation in the housing, an annular clearance between said shaft and said housing providing a fluid passage within the housing, said housing having an inlet port and an outlet port at opposite ends of said clearance, means operable by hydraulic fluid for angularly reciprocating the shaft, means for directing at least a portion of the fluid to said inlet port, and means connected to said outlet port for directing fluid from said passage against the windshield.

7. The apparatus of claim 6 in which the shaft is sealed at each end thereof with respect to the housing, and the inlet and outlet ports are between the sealed ends of the shaft.

8. A windshield cleaning apparatus comprising a windshield wiper arm which includes a shaft having a pinion gear thereon, a hydraulic cylinder with a reciprocable piston therein, the piston having a gear rack thereon in engagement with the pinion gear for angularly reciprocating the same, means for introducing fluid to the cylinder for reciprocating the piston, and means for conducting at least a portion of the fluid to the windshield for washing the same.

9. A windshield cleaning apparatus comprising a windshield wiper arm, a housing having a bore, a hydraulic cylinder with a piston therein axially reciprocable with respect to the housing, a rod attached to the piston and reciprocable therewith, a portion of the rod extending into the bore and having a spiral groove therein, an abutment fixed within said housing and extending into the groove for causing angular reciprocation of the rod as the rod reciprocates axially, first means for directing fluid to the cylinder for axially reciprocating the piston, second means for directing a portion of the fluid to the windshield, the wiper arm having a connection to the rod portion which permits axial sliding of the rod with respect to the wiper arm but prevents relative angular motion therebetween whereby angular reciprocation of the rod portion is imparted to the wiper arm.

10. A windshield cleaning apparatus in accordance with claim 9 in which the second means includes a passage through the housing, and the abutment is exposed to fluid in the passage for lubrication thereby.

References Cited in the file of this patent
UNITED STATES PATENTS

| | | |
|---|---|---|
| 2,516,558 | Freedman et al. | July 25, 1950 |
| 2,781,745 | Bailes | Feb. 19, 1957 |
| 2,835,916 | Mittag et al. | May 27, 1958 |
| 2,952,864 | Nixon | Sept. 20, 1960 |